Patented Jan. 23, 1951

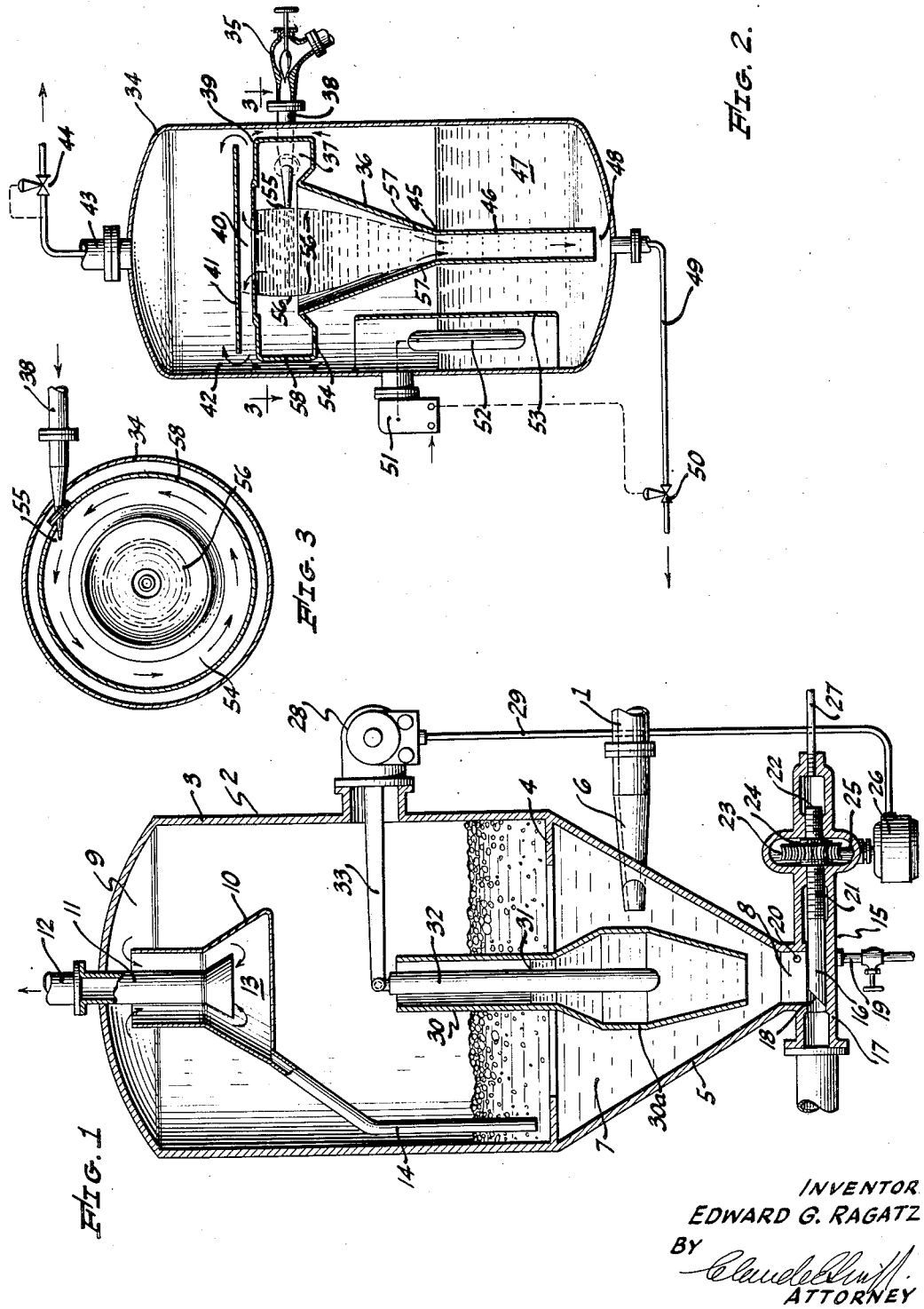

2,538,947

UNITED STATES PATENT OFFICE 2,538,947

FRACTIONATION METHOD

Edward G. Ragatz, San Marino, Calif.

Application May 10, 1948, Serial No. 26,147

11 Claims. (Cl. 260—676)

This invention relates generally to a method and apparatus for continuous separation of solid wax and hydrate fractions from the vapor portion of a low-temperature moisture and wax containing hydrocarbon feed stream, and particularly to the separation of said solids by dispersion in a carrier-liquid medium at a vapor separator whereby the wax and hydrate solids are continuously removed from said separator at approximately the same rate as introduced or formed therein, and whereby the liquid medium may be further processed without deleterious separation of said solids from said medium. This application is a continuation in part of my application, Serial Number 654,767, filed March 15, 1946, Patent 2,495,287.

In many processes operations involving hydrocarbon mixtures, such as the recovery of desirable components from a high-pressure rich field gas stream, treatment at low temperature markedly increases the efficiency and economy of the operation. However, when such a stream contains moisture and/or waxy components, chilling to the desired low temperature causes the water and waxy components to form solid phases of ice and/or hydrate, and amorphous or crystalline waxes.

In the past, proposals to process such wax and moisture containing hydrocarbon mixtures at the more efficient lower temperatures have been blocked by the formation of hydrate and wax solids in such manner and form as to congest or plug the processing apparatus to the extent of making it commercially inoperable.

By the operation of my process and apparatus, I am able to overcome these difficulties and continuously process hydrocarbon mixtures containing moisture and waxy components at advantageous low operating temperatures without deleterious congestion or plugging of the processing apparatus.

The general object of the present invention is to provide an improved hydrocarbon processing method and apparatus whereby solid hydrates and waxes are formed and continuously handled in such a manner as to permit and promote processing at desirable low temperatures without deleterious incumbering of the apparatus with accumulations of said solids.

A further objective of this invention is to bring a substantial volume-ratio of carrier-liquid into intimate contact with a low temperatured wax and hydrate forming hydrocarbon vapor stream while said solids are still in a well divided state therein, whereby a highly effective transfer and dispersion of said finely divided solids is effected into the carrier-liquid.

A further objective of this invention is to so disperse wax and hydrate solids in a carrier-liquid medium as to permit subsequent handling and processing of the resultant liquid mixture without deleterious settling out and incumbering of the processing apparatus with accumulations of said solids.

A further object of this invention is to continuously remove wax and hydrate solids in a liquid dispersed state from a vapor-liquid separating zone at approximately the same rate as introduced or formed therein.

A further object of this invention is to produce a hydrocarbon gas stream sufficiently denuded of water content to permit ready handling in regular commercial fuel-gas transmission systems without need for additional dehydration.

A further object of this invention is to provide a high volume-ratio of hydrocarbon carrier-liquid at a zone of intimate contact with a moisture and wax containing hydrocarbon vapor stream by recirculation of a portion of said carrier-liquid through said zone.

A further object of this invention is to provide a substantial volume-ratio of hydrocarbon carrier-liquid at a zone of intimate contact with a moisture and wax containing hydrocarbon vapor stream through recirculation of a portion of the carrier-liquid at said zone by the aid of jet-action of the hydrocarbon feed stream entering said zone.

A further object of this invention is to so introduce a moisture and wax containing hydrocarbon feed-stream into a high volume-ratio of liquid, that said vapor stream is broken up and intimately mixed with said liquid to the end that all the solid hydrate and wax content of said vapor stream is transferred to, and dispersed in, said liquid.

A further object of this invention is to provide an apparatus of such a character that a hydrate and wax solid containing hydrocarbon vapor feed-stream is directed into, and below a confined upper surface of, a liquid body whereby said vapors are thoroughly broken up and intimately mixed with said liquid body.

A further object of this invention is to provide an apparatus of such a character that small volumes of liquid present in a hydrocarbon vapor feed-stream are trapped and recirculated in large volume-ratio through a zone of vapor-liquid contact by jet-action of said vapor feed-stream.

A further object of this invention is to provide an apparatus wherein a wax and hydrate carrying liquid stream traverses a surge-liquid storage zone (which surge-liquid is utilized for "leveling" a process flow) but into which only a small portion of the hydrate and wax containing carrier-liquid migrates, thus reducing the possibility of deleterious accumulations of hydrate and wax solids in "dead" portions of said surge-liquid storage zone.

Another object of this invention is to provide an apparatus which utilizes tangential jet-action of an incoming vapor feed-stream for effecting intimate contact between a recirculated carrier-liquid medium and the incoming feed-stream wherein wearing portions subjected to corrosive and erosive action of said feed-stream are separate and apart from the main pressure-vessel structure of the apparatus.

In my earlier application, Serial No. 654,767, filed March 15, 1946, a process and apparatus was disclosed for effecting a continuous removal of solid hydrates from the vapor portion of a vapor-liquid-hydrate feed-stream by introducing said feed-stream beneath a liquid level in a vapor separator in such a manner that:

A. A large volume-ratio of hydrocarbon carrier-liquid is recirculated through a zone of intimate contact with said feed-stream by the jet-action of said stream while said solid hydrates are still in a finely divided state therein, whereby a highly effective transfer and dispersion of said finely divided solids is effected into said carrier-liquid.

B. The main body of hydrocarbon liquid confined within the separator is maintained in a state of agitation by the introduction of the feed-stream into said body beneath its upper surface, thereby preventing any settling out of suspension of the solid hydrate content of said liquid body.

C. Gas substantially denuded of water vapor is continuously withdrawn from above the surface of the liquid body within the separator, and carrier-liquid containing dispersed solid hydrates is continuously withdrawn from below said liquid surface.

D. Solid hydrates are continuously withdrawn from the separator at approximately the same rate as introduced or formed therein.

The above process and apparatus described in my application, Serial No. 654,767, filed March 15, 1946, is shown in Figure 1.

Figure 1 is an elevation in cross section.

Figure 2 is an elevation in cross section of a modification.

Figure 3 is a cross section taken on the lines 3—3 of Figure 2.

The separating chamber 2, as illustrated in Figure 1, is shown to comprise a shell 3 having below the inside baffle ring 4 a conical bottom portion 5 into which the reduced pressure gas stream, carrying condensate and hydrates, is discharged through the tangentially positioned nozzle 6 into an agitated body 7 of condensate and hydrate slurry. Entrainment may be removed from the residual gas in any suitable manner, as by means of a separator 9 contained in the upper interior of the shell and shown conventionally to comprise an inner open top shell 10 into which the gas flows downwardly as indicated by the arrows, and from which the mist-free gas leaves through the outlet pipe 11 connecting with the discharge line 12. Liquid collecting in the separator chamber 13 is returned to the slurry body 7 through the drain line 14.

The withdrawal of the hydrate-condensate slurry from the separating chamber is controlled by an appropriate valve assembly, generally indicated at 15 below the outlet 8, operation of the valve in turn being controlled in accordance with the liquid level in the chamber. Preferably I employ a slide-type valve control in which the valve proper, indicated at 16, is slidable within the body 17 and has an angular cut-off end 18, the shape and extent of which with relation to the outlet 8 prevents accumulation in the path of the valve of hydrates that might otherwise tend to interfere with proper valve action and response. As a further expedient to prevent clogging accumulations of hydrates at the valve, gas taken from any suitable source in the system may be discharged from pipe 19 through the body passage 20 at one or both sides of the valve to maintain an effective hydrate displacing agitation within that portion of the outlet 17 farthest from the cut-off end of the valve. The valve may have any suitable non-rotative connection at 21 with screw shaft 22 to which is threaded a gear 23 so that opposite rotations of the gear reciprocally move the valve. Gear 23 is suitably driven by a worm, conventionally illustrated by the dotted lines 24, on shaft 25 driven by the motor 26. Access of hydrates to parts of the drive beyond the right of the valve 20, may be prevented by admitting gas through line 27 for leakage along and past the screw shaft 22 and the attached portion of the valve into the vicinity of the outlet 8.

Motor 26, and therefore the valve 16, are made responsive to liquid level changes in the separating chamber, and controlled to maintain a substantially constant liquid level by suitable, e. g., torque tube, level control 28 having the usual connection 29 with the motor. The slurry mass 7 being kept in a state of very active agitation with inter-mixed vapors, provision is made for a communicating zone isolated from the agitation to establish approximately the true equivalent liquid level. For this purpose I may locate centrally within the chamber a tubular open end guard or baffle 30 in which condensate assumes substantially the equivalent coalesced liquid level 31. As illustrated, the lower enlarged and downwardly tapered portion 30a of the guard may have such occupancy of the bottom portion of the separating chamber as to maintain high velocity and displacement of the swirling slurry and thus assure complete entrainment of the hydrates. The control 28 is operated in accordance with the liquid level 31 by float 32 attached to the control arm 33.

It now develops that for a broad range of hydrocarbon mixtures, continued agitation of the main body of surge-liquid normally carried within the separator shell can be dispensed with, providing the hydrate and wax solids are properly dispersed in the carrier-liquid during initial contact with the incoming feed-stream.

This development makes possible the modified design of jet-agitated liquid-dispersion separator detailed in Figure 2, which design has the following mechanical advantages over the earlier design of Figure 2 of Serial No. 654,767, filed March 15, 1946:

A. Its wearing parts are distinct from the main pressure-vessel shell and hence:

1. Are more readily replaceable;
2. Eliminate the possibility of an inadvertent dangerous weakening of the pressure-vessel shell through undetected erosion or corrosion of the recirculation contact surfaces.

B. It presents a more compact arrangement of parts to the end that the same "liquid surge" capacity can be provided in a substantially smaller-sized pressure-vessel.

C. It utilizes a simpler liquid level control valve.

In detail, the process employing this particular design of separator contemplates introducing a low-temperatured hydrocarbon feed-stream containing vapors, liquids, and solid-forming wax and/or moisture constituents, beneath a confined liquid surface in a special contacting unit located within a pressure-vessel shell; which unit is so arranged, and the feed-stream so introduced, that any incoming liquid is trapped in the zone of feed introduction and recirculated therein in intimate contact with additional incoming vapors by jet-action of said feed-stream.

After a sufficient volume of liquid has been accumulated in this contacting zone to meet the need for a substantial volume-ratio recirculation of liquid with the incoming feed-stream, any additional entering liquid will automatically drain away from said contacting zone, carrying with it effectively dispersed wax and hydrate solids extracted from the feed-stream; and the rate of withdrawal of said wax and hydrate solids will be approximately the same as their rate of introduction and formation within said contacting zone.

The vapor portion of the feed-stream separates from the liquid portion within this contacting unit, rises upward through a central opening in a "liquid confining" horizontal baffle comprising the upper member of said unit, and thence flows horizontally past an appropriate mist extracting baffle to leave the separator via a vapor outlet located in the upper portion of the pressure-vessel shell. Under appropriate conditions of control, these vapors will be sufficiently denuded of moisture content to permit subsequent ready handling in regular commercial fuel-gas transportation systems without any further dehydration.

A substantial volume of liquid is retained in the lower portion of the pressure-vessel shell to provide the "liquid-surge" capacity normally required at vapor separators operating in series with other items of processing equipment. Excess material drain from the recirculation section of the contacting unit is conducted through this body of surge-liquid via an appropriately sized conductor tube attached to the lower lip of a drain cone comprising the lower portion of the contacting unit. This conductor tube is in axial alignment with, and cooperates with, the liquid draw-off line from the separator; but stops short of contact with the main pressure-vessel shell at the liquid draw-off opening to permit free-flow of liquid into and out of the main body of surge material carried in the base of the separator.

With this construction, the major portion of hydrate and waxy solids removed from the incoming feed-stream are moved continuously and directly out of the separator without contact with or dispersion into the main body of surge-liquid, thus reducing to a minimum the possibility of deleterious accumulation of said solids in the more quiescent zones of said surge-liquid chamber.

Figure 2 presents an elevation and cross section view of one form of jet-agitated liquid-dispersion separator covered by this invention in which 34 is the main pressure-vessel shell; 35 is an inlet valve controlling admission of the feed-stream to the separator; 36 is the contacting unit of the separator; 37 is the upper portion of said unit in which incoming liquid is trapped and recirculated in large volume-ratio through a vapor-liquid contacting zone; 38 is a nozzle on the incoming feed line so located as to promote the recirculation of trapped liquid through tangential jet-action of the incoming feed stream; 39 is a horizontal confining baffle which serves to maintain a substantial volume and depth of carrier-liquid into which the incoming feed stream "blasts," thereby providing the mechanism for thoroughly breaking up and intimately mixing the incoming feed-stream with the recirculated carrier-liquid; 40 is a central opening in horizontal baffle 39 through which separated vapors flow on their way out of the separator; 41 is a mist extracting baffle so located as to cause the separated vapors to flow horizontal-wise and attain substantial velocity as they emerge at opening 42 between plate 41 and the pressure-vessel shell, whereby any entrained liquid still carried by the vapors is thrown out and drained back into the base of the separator; 43 is the vapor outlet from the separator; 44 is a back pressure regulator controlling the pressure in the separator; 45 is the drain cone of the contacting unit serving to induct separated wax and hydrate carrying liquid into conductor tube 46, which tube serves to isolate the liquid production of the separator from the more or less quiescent surge-liquid body maintained in surge-liquid storage section 47 of the separator; 48 is an appropriate opening between the end of tube 46 and shell 34 through which surge-liquid flows in and out of storage section 47 to meet the "rate leveling" demands of the particular process in which the separator is operated; 49 is the liquid-wax-hydrate draw-off line; 50 is the draw-off line control valve; 51 is a liquid level controller actuated by liquid level float 52; and 53 is an open-ended liquid level float guard.

As an illustration of the operation of this apparatus, we may consider its handling of a high-pressure moisture and wax containing rich hydrocarbon field-gas stream; which stream may consist solely of materials as produced from the well, or may include additional liquid fractions (normally low molecular-weight absorption oil) added to the stream ahead of valve 35 to increase the liquefaction rate of desired recoverable fractions.

Hydrate and waxy solids may or may not be present in the feed stream ahead of control valve 35. In many cases such constituents will be absent at this point, with the feed-stream being cooled just slightly short of the temperature at which hydrate formation begins. The feed-stream may be at a relatively high pressure, say 2000 pounds per square inch, with the separator held at a substantially lower pressure, say 1200 pounds per square inch. Under such circumstances, a substantial auto-chilling action will take place in the feed-stream as it "blows down" through control valve 35, resulting in the formation of finely divided solid hydrates and waxes, along with a greater or less volume of retrograde condensate.

This feed-stream, with its finely divided content of solid hydrate and waxes, is then "blasted" into a substantial body of carrier-liquid in contacting section 37 by aid of nozzle 38; which liquid body is restrained from "opening up" and permitting the high-velocity feed-stream to escape in a more or less compact mass by the confining action of horizontal baffle plate 39. As a result:

(a) A substantial portion of the energy of the high-velocity feed-stream jet is applied to the maintenance of a high-ratio recirculation flow of carrier-liquid past the jet tip.

(b) A substantial portion of the balance of the jet energy is absorbed in thoroughly breaking up the feed-stream and intimately mixing it with the recirculated carrier-liquid, with this intimate mixing being particularly effective as regards the feed-stream solids.

Through this action the finely divided hydrate and solid wax content of the feed-stream is thoroughly dispersed within the carrier-liquid, making it possible to readily handle the resultant mixture through subsequent processing stages without any deleterious separation of said solids from said carrier-liquid.

Sufficient carrier-liquid for effecting the required liquid-vapor volume-ratio contacting with the incoming feed-stream may be obtained from even a small "net" production of retrograde condensate by the "trap" construction of contacting section 37. This contacting section includes a depressed concentric section 54 which acts to trap any small quantity of liquid associated with the incoming feed-stream. Tip 55 of nozzle 38 is so located that the velocity energy of the incoming feed-stream will pick up any liquid trapped in section 54, and recirculate it by tangential jet-action past the zone of emergence of the feed-stream from nozzle 38. As a result a large volume-ratio of liquid will be provided for the contacting zone just beyond nozzle tip 55 when only a small "net" volume of liquid is associated with the incoming feed-stream.

After contacting section 37 is filled to capacity with recirculating liquid, any additional liquids or solids will be automatically drained off through cone 45 and conductor tube 46 at approximately the same rate as introduced or formed in contacting section 37.

Due to the centrifugal action of the liquid trapped in contacting section 37, the vapors leaving this section via opening 40 will be largely denuded of liquid droplets. In order to be certain that the exit vapors are thoroughly dried, however, separator plate 41 is located above opening 40 and close to confining baffle 39, to the end that the exit vapors will develop a relatively high velocity adjacent the pressure-vessel shell as they escape through peripheral opening 42 formed between the edge of plate 41 and shell 34. Any liquid droplets carried out of contacting section 37 will be thrown against shell 34 at this point, and drained back into the base of the separator.

Contacting unit 36 with its jet recirculation section 37 may be made of alloy steel for protection against erosion and corrosion, and be so constructed as to be replaceable in sections through an appropriate manhole in shell 34 of the pressure-vessel. In addition to making this portion of the apparatus of alloy steel, it may also be advisable to make the wearing section 58 of the recirculation contacting section heavier in order to withstand the extra wear associated with the corrosive and erosive action of the high-velocity liquid confined in this portion of the apparatus. The liquid in cone 45 assumes the shape illustrated by 56.

Normally the liquid level in the base of the separator will rise or fall over some little distance as the rate of liquid withdrawal from the separator is varied. This will result in a small back-and-forth flow of liquid through peripheral opening 48 formed between the end of down pipe 46 and shell 34. At the same time, however, the majority of the hydrate and wax bearing liquid stream from contacting section 37 will flow continuously through tube 48 and out line 49 without intermingling with the main portion of the surge-liquid in section 47, thus avoiding any undue accumulation of hydrate and wax solids in the quiescent liquid storage portions of the separator.

I claim:

1. The process of recovering higher boiling constituents from a high pressure hydrocarbon vapor feed-stream containing moisture and hydrate forming compounds which comprises commingling said stream in a zone of intimate contact with a cold carrier-liquid containing dispersed hydrate thereby congealing the hydrate forming material present in said stream, dispersing the solid material in the cold carrier-liquid, removing vapors from said zone, separating a portion of the carrier-liquid containing dispersed hydrate, recycling said separated portion to said zone of intimate contact, and removing carrier-liquid containing dispersed solids from said zone.

2. A process of recovering higher boiling constituents from a high pressure hydrocarbon feed mixture containing gaseous and liquid hydrocarbons and solid hydrate which includes the steps of establishing a body of retrograde condensate, controlling the upper level of said body of condensate, continuously introducing said high pressure hydrocarbon feed mixture into said body of condensate at a point between the upper and lower levels of said body of condensate, maintaining the body of condensate containing the solid hydrate in a state of agitation by the introduction of said feed into said body thereby preventing settling out of suspension of the solid hydrate, removing gas from a zone above the upper level of said body of condensate, and continuously withdrawing a mixture of retrograde condensate and solid hydrate from said body, the rate of withdrawal of said solid hydrate from said body being substantially equal to the rate of introduction into said body.

3. A process of recovering higher boiling constituents from a high pressure hydrocarbon feed mixture containing gaseous and liquid hydrocarbons and solid hydrate which comprises, establishing a body of retrograde condensate, tangentially introducing into said body of retrograde condensate said high pressure hydrocarbon feed mixture at a point between the upper and lower levels of said body, maintaining said body of condensate containing the solid hydrate in a state of agitation by the tangential introduction of said feed into said body thereby preventing settling out of suspension of the solid hydrate, withdrawing gas from a zone above the upper level of said condensate body, and withdrawing a mixture of hydrate and condensate from said body.

4. A process of recovering higher boiling constituents from a high pressure hydrocarbon feed mixture containing gaseous and liquid hydrocarbons and solid hydrate which includes the steps of establishing a body of retrograde condensate, introducing said high pressure hydrocarbon feed mixture into said body of condensate at a point between the upper and lower levels of said body of condensate, maintaining said body of condensate containing the solid hydrate in a state of agitation by the introduction of said feed into said body thereby preventing settling out of suspension of the solid hydrate, withdrawing gas from a zone above the upper level of said body of condensate, and withdrawing a mixture of retrograde condensate containing solid hydrate from said body.

5. A process of recovering higher boiling constituents from a relatively high pressure hydrocarbon mixture containing moisture and hydrate forming compounds which includes the steps of reducing the pressure upon said high pressure hydrocarbon mixture through a range productive of retrograde condensate and solid hydrate formation, introducing said condensate and solid hydrate mixture into a body of retrograde condensate at a point between the upper and lower levels of said body of condensate, maintaining said body of condensate containing the solid hydrate in a state of agitation by the introduction of said feed into said body thereby preventing settling out of suspension of the solid hydrate, withdrawing gas from a zone above the upper level of said body of condensate, and withdrawing a mixture of retrograde condensate containing solid hydrate from said body.

6. The process of recovering higher boiling constituents from a relatively high pressure hydrocarbon mixture containing moisture and hydrate forming compounds which includes the steps of reducing the pressure upon said high pressure hydrocarbon mixture through a range productive of retrograde condensate and solid hydrate formation, continuously introducing said condensate and solid hydrate mixture into a body of retrograde condensate at a point between the upper and lower levels of said body of condensate, maintaining the body of condensate containing the solid hydrate in a state of agitation by the introduction of said feed into said body thereby preventing settling out of suspension of the solid hydrate, withdrawing gas from a zone above the upper level of said body of condensate and withdrawing a mixture of retrograde condensate containing solid hydrate from said body of condensate.

7. The process of recovering higher boiling constituents from a relatively high pressure hydrocarbon feed mixture containing moisture and hydrate forming compounds which includes the steps of reducing the pressure upon said high pressure hydrocarbon mixture through a range productive of retrograde condensate and solid hydrate formation, tangentially introducing said condensate and solid hydrate mixture into a body of retrograde condensate at a point between the upper and lower levels of said body of condensate, maintaining the body of condensate containing the solid hydrate in a state of agitation by the introduction of the feed into said body thereby preventing settling out of suspension of the solid hydrate, controlling the upper level of said body of condensate, withdrawing gas from a zone above the upper level of said body of condensate, and withdrawing a mixture of retrograde condensate containing solid hydrate from said condensate body.

8. The process for recovering higher boiling constituents from a relatively high pressure hydrocarbon mixture containing moisture and hydrate forming compounds which includes the steps of reducing the pressure upon said high pressure hydrocarbon mixture through a range productive of retrograde condensate and solid hydrate formation, introducing said mixture containing condensate and solid hydrate into a body of retrograde condensate at a point between the upper and lower levels of said body of condensate, maintaining said body of condensate containing the solid hydrate in a state of agitation by the introduction of said feed into said body thereby preventing settling out of suspension of the solid hydrate, withdrawing gas from a zone above the upper level of said body of condensate, and withdrawing a mixture of retrograde condensate containing solid hydrate from said body of condensate, the rate of withdrawal of the solid hydrate from said body of condensate being substantially equal to the rate of solid hydrate introduction into said body of condensate.

9. The process of recovering higher boiling constituents from a relatively high pressure hydrocarbon mixture containing moisture and hydrate forming compounds which includes the steps of reducing the pressure upon said high pressure hydrocarbon mixture through a range productive of retrograde condensate and solid hydrate formation, continuously introducing said hydrocarbon mixture containing condensate and solid hydrate into a body of retrograde condensate at a point between the upper and lower levels of said body of condensate, maintaining said body of condensate containing the solid hydrate in a state of agitation by the introduction of said feed into said body thereby preventing settling out of suspension of the solid hydrate, controlling the upper level of said body of condensate, withdrawing gas from a zone above the upper level of said body of condensate, and withdrawing a mixture of retrograde condensate containing solid hydrate from said body of condensate, while maintaining the withdrawal of said solid hydrate from said body of condensate at a rate substantially equal to the rate of solid hydrate introduction into said body of condensate.

10. A process of recovering higher boiling constituents from a high pressure hydrocarbon feed mixture containing gaseous and liquid hydrocarbons and solid hydrate which includes the steps of establishing a body of retrograde condensate, introducing said high pressure hydrocarbon feed mixture into said body of condensate, maintaining said body of condensate in a state of agitation to disperse said solid hydrate into said condensate body thereby preventing settling out of dispersion of the solid hydrate, withdrawing gas from said body of condensate at a point above the liquid level of said body of condensate, and withdrawing a mixture of solid hydrate and liquid condensate from said body, the rate of withdrawal of said solid hydrate from said body of condensate being substantially equal to the rate of solid hydrate introduction into said body of condensate.

11. A process of recovering higher boiling constituents from a high pressure hydrocarbon gas stream containing gaseous and liquid hydrocarbons and solid hydrate which includes the steps of separating liquid and solid hydrate constituents from said gas stream, circulating a body of hydrate-dispersed hydrocarbon liquid through a dispersion zone, introducing the separated liquid and solid hydrate constituents into the circulating liquid in said dispersion zone while agitating to disperse said solid hydrate in finely divided form in said circulating liquid and to prevent agglomeration and settlement of the solid hydrate therein, withdrawing a portion of said hydrate-dispersed liquid from said body, and recirculating the remaining portion of said hydrate-dispersed liquid body through said dispersion zone.

EDWARD G. RAGATZ.

REFERENCES CITED

The following references are of record in the file of this patent:

UNITED STATES PATENTS

| Number | Name | Date |
| --- | --- | --- |
| 2,284,112 | Walker et al. | May 26, 1942 |
| 2,323,525 | Ebel et al. | July 6, 1943 |
| 2,363,529 | Hutchinson | Nov. 28, 1944 |
| 2,375,559 | Hutchinson et al. | May 8, 1945 |
| 2,375,560 | Hutchinson et al. | May 8, 1945 |
| 2,399,723 | Crowther | May 7, 1946 |
| 2,428,045 | Sharp et al. | Sept. 30, 1947 |